Dec. 1, 1953  J. D. RUST  2,660,848
COTTON HARVESTER WITH RETRIEVER MECHANISM
Filed April 25, 1950  4 Sheets-Sheet 1
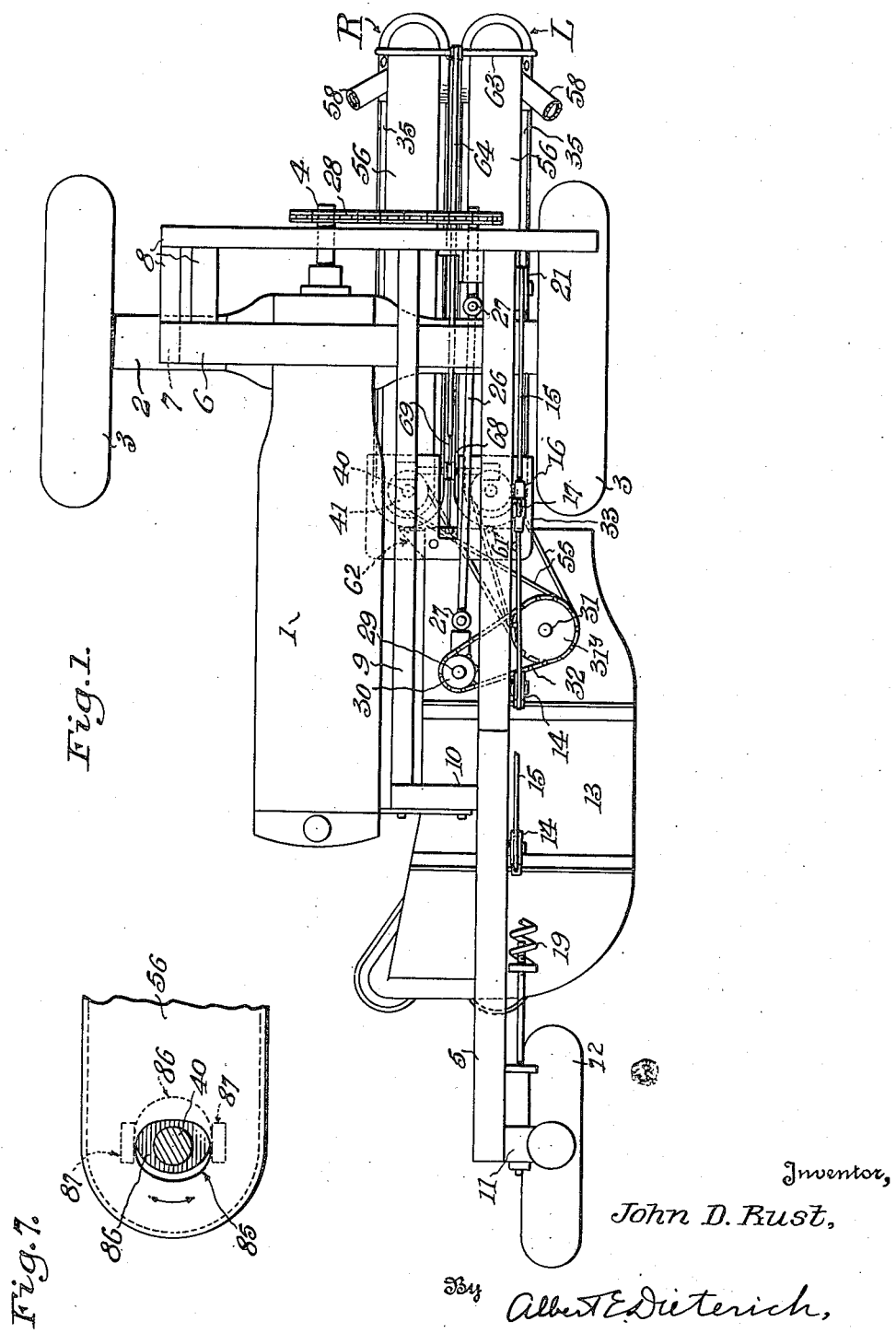
Inventor,
John D. Rust,
By Albert E. Dieterich,
ATTORNEY Dec. 1, 1953   J. D. RUST   2,660,848
COTTON HARVESTER WITH RETRIEVER MECHANISM
Filed April 25, 1950   4 Sheets-Sheet 2

Inventor,
John D. Rust,
By Albert E. Dieterich,
ATTORNEY.

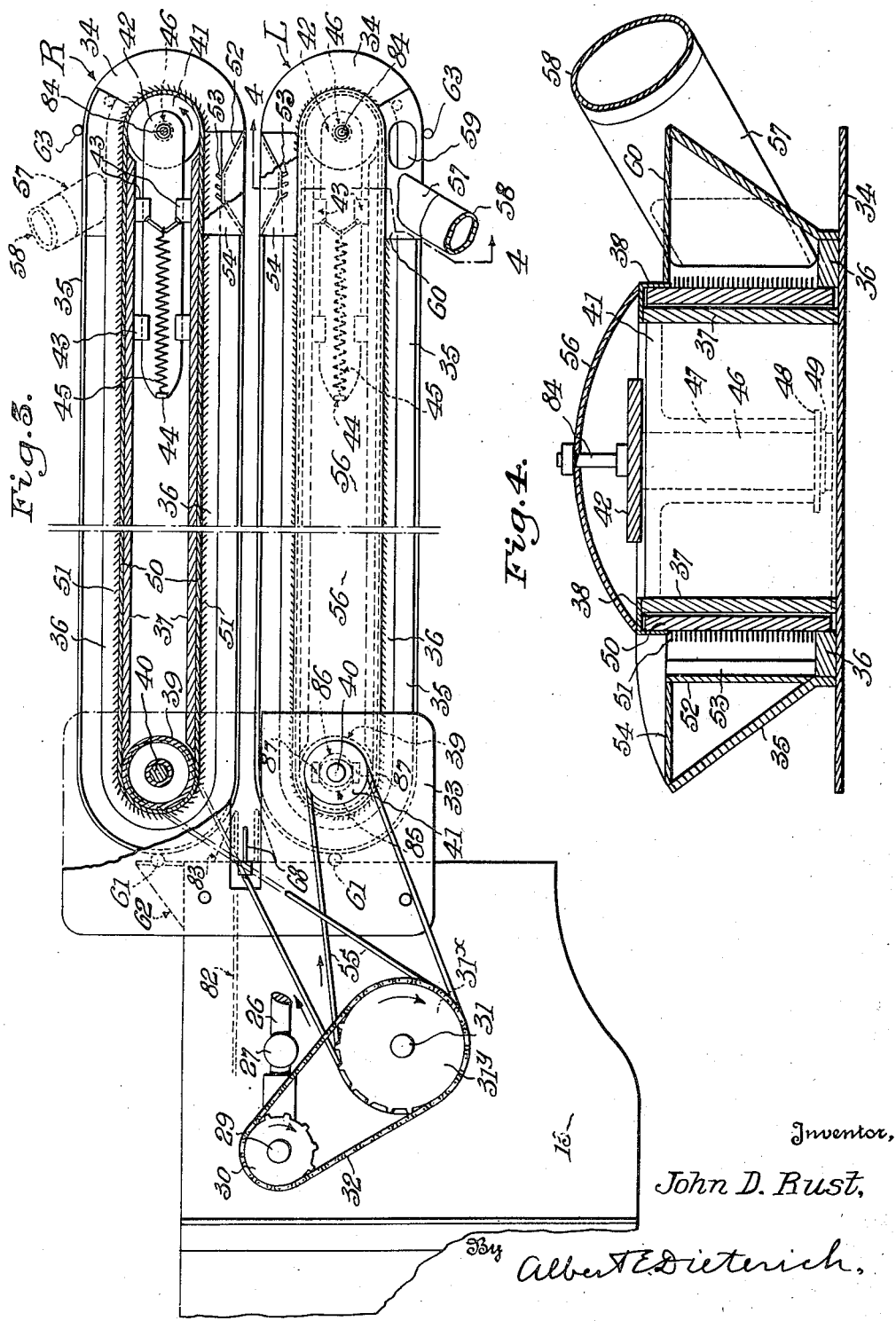

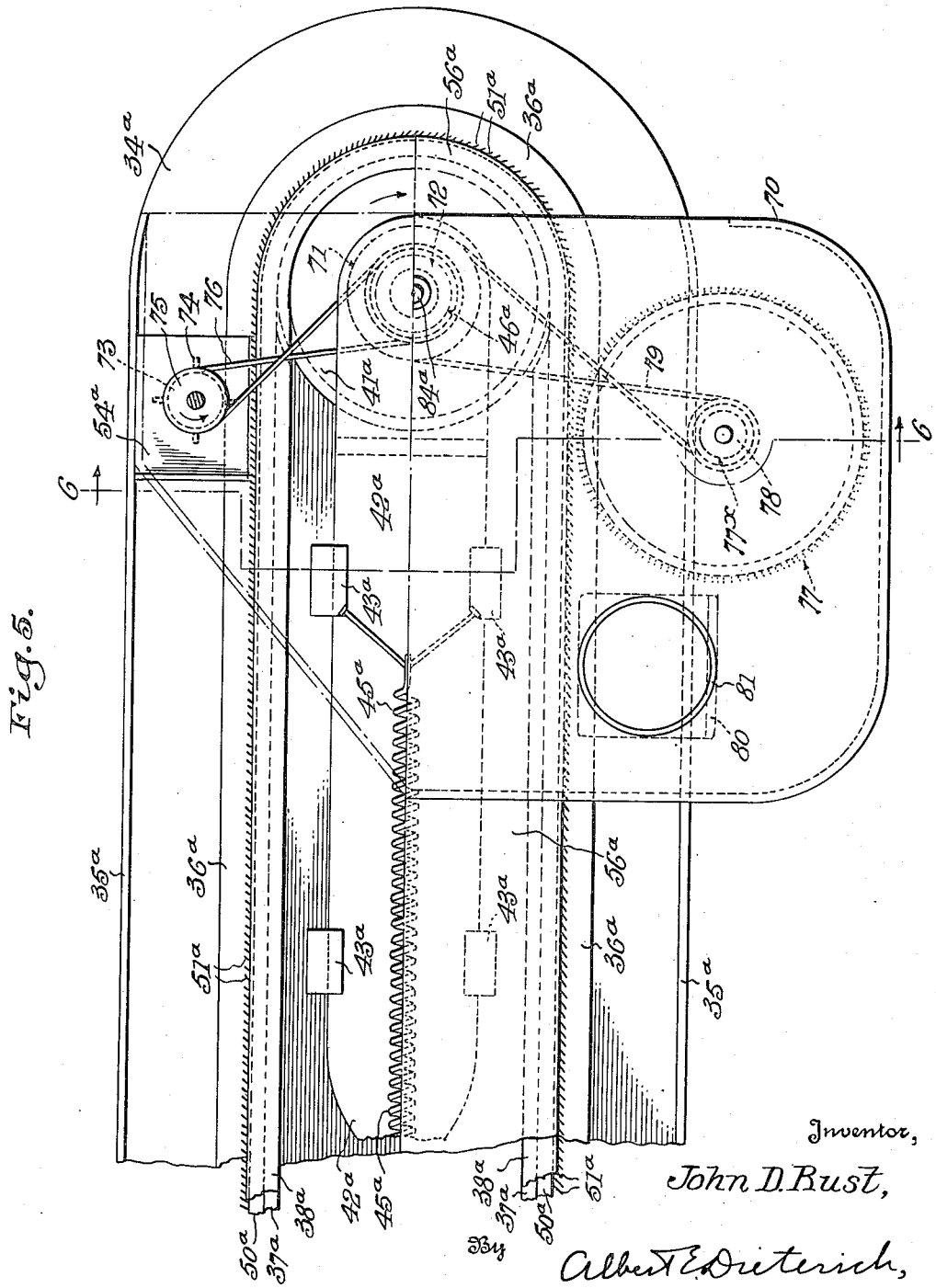

Patented Dec. 1, 1953

2,660,848

UNITED STATES PATENT OFFICE 2,660,848

COTTON HARVESTER WITH RETRIEVER MECHANISM

John D. Rust, Pine Bluff, Ark.

Application April 25, 1950, Serial No. 158,037

13 Claims. (Cl. 56—30)

My invention relates broadly to cotton picking machines and more specifically to cotton retrieving devices which are to be used with cotton picking machines. Experience has shown that under some field conditions cotton picking machines allow some of the cotton to drop to the ground and thus be wasted. It is to prevent this waste that my present invention provides effective means for catching the falling cotton before it reaches the ground, and to separate the cotton from any trash that might be mixed with the cotton.

One of the objects of my present invention is to provide an attachment for cotton picking machines to catch any loose cotton that may fall from the plants as the picking unit of the machine has passed over the plants and before such cotton can reach the ground.

Another object of the present invention is to separate and eject any trash that might be mixed with the cotton.

I have heretofore used cotton retrievers or salvage devices such as those disclosed in U. S. Patents Nos. 2,058,514, issued October 27, 1936, and 2,175,216, issued October 10, 1939, but have found that those devices gathered considerable trash along with the cotton; hence the present invention provides means to overcome the deficiency of the means disclosed in these patents.

To the attainment of the aforesaid objects, invention still further resides in the novel details of construction, combination, and arrangement of parts, all of which will be first fully described in the following detailed description, and then be particularly pointed out in the appended claims, reference being had to the accompanying drawings, in which:

Fig. 1 is a schematic plan view of so much of a cotton picking machine as is helpful in illustrating the application of my invention to the same.

Fig. 2 is a side elevation of the same.

Fig. 3 is an enlarged detail plan view of my improved cotton retriever mechanism, parts being in section and parts broken away.

Fig. 4 is an enlarged cross sectional view on the line 4—4 of Fig. 3.

Fig. 5 is an enlarged top plan view of the rear portion of a unit showing a modified form of the left hand unit L of Figure 3 with certain portion being in section.

Fig. 6 is an enlarged cross sectional view on the line 6—6 of Fig. 5.

Fig. 7 is an enlarged detail view of the cover shaker cam and cover.

In the drawings, 1 represents the tractor, 2 the rear axle unit, 3 the traction wheels, 4 a power take-off shaft, 5 a main longitudinal beam which carries the picker unit 13, 6 the main transverse beam which is supported on posts 7 secured to the rear axle unit, and 8 represents an extension frame. 9 represents a supplemental longitudinal beam that extends from a rear transverse beam, not shown, of the frame 8 to a cross beam 10 that cradles the front end of the tractor.

The main beam 5 carries a steering post bracket 11 providing a support for a steering post $11^x$, which carries a steering wheel 12.

The picker unit 13 is suspended from the frame beam 5 by cables 15 running over guide pulleys 14, the cables being connected to a lever 17 at 16. Another cable 20 runs over a guide pulley 21 and is attached to one end to the lever 17 and at the other end the cable 20 is connected to one of the ends of a spring 19. The spring is also connected to an adjusting rod and nut device 22 by means of which the force of the spring can be regulated. The lever 17 is pivoted at 18. Pivoted at 24 and 25 is a connecting rod 23, by which rod the front end of the picker unit 13 is kept in position longitudinally.

26 is an articulated propeller shaft for the picker unit; this shaft has universal joints 27 and is driven from the power take-off shaft 4 through a chain and sprocket drive 28.

The foregoing enumerated parts are of known construction and, per se, are not a part of my present invention.

Mounted on the picker unit is a counter-shaft 29 having a drive pulley 30, the shaft 29 being driven by the shaft 26.

A driving shaft 31 carries a two-groove pulley and sprocket $31^x$, $31^y$, and is driven by a chain 32 from the counter-shaft pulley 30.

The cotton retriever

The cotton retriever which comprises my present invention consists of two identical units or sections, a right R and a left L; so a detailed description of one of such units or sections will suffice for both.

By referring now particularly to Figs. 2, 3, and 4 of the drawings, it will be seen that 34 is the bottom plate of a trough-like structure that includes an inclined flange or wall 35. The wall 35 extends around at the front end of the retriever and along the sides and terminates adjacent the rear end of the retriever.

Mounted at the front of the plate 34 is a driving shaft 40 which carries a pulley 41. The shaft 40 is articulated, having universal joints $40^x$ (Fig. 2)

and a slip joint 40y; a bearing for the upper end of the shaft 40 is provided in a plate 33 attached to the top of the picker unit 13. The shaft 40 is driven from the shaft 31 by a belt 55 via pulleys 31x and 41.

42 indicates a pulley-carrying slide which operates in fixed guides 43 and which has a lug 44 to which one end of a spring 45 is hooked, the spring being also connected to the rearmost pair of guides 43, as best shown in Fig. 3. The slide 42 carries a pin or stud shaft 46 (Fig. 4) on which the driven belt pulley 41a is journaled and held in place by a washer 48 and lock ring 49 against the bearing sleeve 47.

50 represents a flexible belt having a large number of teeth 51 similar to those used on seed-cotton cleaning equipment. The belt 50 runs over the forward pulley 39 mounted on shaft 40 beneath pulley 41 and over the rear pulley 41a and at its edges is guided between bars 36 and angle guides 38, the latter being mounted on belt backing plates 37 mounted on the floor plate 34 (see Fig. 4).

Fixedly mounted in the trough adjacent the rear of the retriever unit is a cotton crowder 52 having a top closure and deflecting plate 54. The crowder 52 has fins 53 that extend in a rearwardly directed angle toward the belt 50 and terminate short of contact with the teeth 51, leaving a narrow space though which the contents of the trough are crowded and pulled past the crowder. The crowder serves to ensure that the cotton will be hooked by the teeth and carried to the place where it is delivered to an offtake nozzle.

At the side of the trough opposite the crowder 52 the trough is covered over for a desired distance, as at 60, a suction nozzle 57 projecting into the trough (see Figs. 3 and 4). Adjacent the nozzle the closure 60 has an air-intake opening 59. The opening 59 and nozzle 57 are so co-related that the suction air stream will not draw in trash which is adapted to be thrown off at the rear end portion of the wall 35 and bottom plate 34 of the retriever while the machine is in operation. Suction is produced in duct 58 and nozzle 57 in any approved way, such, for example, as that disclosed in Pat. No. 2,058,-514 (see Figs. 2 and 23 of that patent).

In order to prevent cotton from falling into the space between the flights of the belt, I provide a material-deflecting shield 56, as shown in Figures 2 and 4.

The retriever units or sections R and L are swivelly connected at the front to the picker unit 13, as at 61. The rear portion of these units are yieldably connected by a bail 63, that is connected to one end of a lever 64 (Fig. 2) that is pivoted at 65 to a bracket 66, the other end of the lever being connected with the picker unit 13 by a cable 69 passing under a pulley 68 on a bracket 67, by virtue of which, as the picker unit 13 and the front end of the retriever rise and fall together, the rear end of the retriever will likewise rise or fall.

The picking unit is provided with suitable guideways 82, 83 to direct the cotton and plants from the plant passageway of the picking unit into the restricted space between the units R and L of the retriever.

At one end the cover 56 is pivoted on a pin 84 on the slide 42. The opposite end of the cover has a slot 85 for passage of the shaft 40. On shaft 40, under the cover or shield 56, is an eccentric 86 operating between stops 87 mounted on the under side of the cover to rock the cover from side to side to agitate it enough to cause material on top of the cover to be shaken off into the trough.

As the cotton plants with any loose cotton thereon leave the picking unit 13 they are guided between the two units of the retriever and any loose cotton that might be adhering to the plants is shaken or jarred loose therefrom by the engagement of the plants with the retriever units and thus the loose cotton is caused to fall into the retriever troughs to be gathered and moved rearwardly by the belts 50. As the plants leave the retriever, any trash which might have been deposited in the troughs will be thrown off by centrifugal force and only the cotton adhering to the teeth 51 will be carried around to the suction nozzle, sucked clear of the belt, and carried to a suitable delivery place.

*The modifications shown in Figs. 5 and 6*

In Figures 5 and 6 there is shown a modification of one of the two units illustrated in Figure 3. It is to be understood that in the modification shown in Figure 6 that there would be two units employed in the same manner as illustrated in Figure 3, namely a right hand and a left hand unit, but in view of the fact that both units are identical the disclosure shown in Figures 5 and 6 is directed to only one unit, namely the left hand unit. In Figures 5 and 6 the parts of the unit shown therein which correspond to the same parts of the unit shown in Figure 3 bear the same reference numerals, plus the index letter "a." In view of the fact that the parts of Figures 5 and 6 would correspond to the same parts in Figure 3, it is felt that a description of these parts would be merely a repetition of the description of the same parts shown in Figure 3, thus a detailed description of these parts will not be set forth.

In place of the fixedly located crowder shown in the preceding figures, I may provide on each retriever unit a housing 70 having suitable bearings, not shown, in which is mounted a rotatable roller 73 having fins 74 and a pulley 75 driven by a belt 76 from a pulley 72 mounted on an extension 46x of the sleeve or hub 46a. The roller 73 rotates in a direction opposite that in which pulley 41a turns in order to restrict and retard the cotton so that it may all be engaged by the teeth on the belt 50a. On the side of the unit opposite the roller 73 I mount a rotatable brush 77 whose bristles engage the teeth 51x of the belt 50a and brush off the cotton that is on the same and impel the cotton toward the suction nozzle 80 on the end of the suction pipe 81. The brush 77 is driven through a belt 79 entrained over a pulley 71 secured to extension 46x of sleeve 46a and over pulley 78 on the hub 77x of the brush. The brush 77 is driven at a much higher speed than the speed of the belt in order to throw off the cotton to the suction nozzle.

Under some conditions of the cotton being harvested it is preferable to employ machines embodying the first embodiment of my invention, while under certain other conditions machines embodying the second form of my invention may be used to a better advantage.

From the foregoing description, taken in connection with the accompanying drawings, it is thought that the construction, operation and advantages of the invention will be clear to those skilled in the art.

What I claim is:

1. In a cotton picking machine wherein a traveling picker unit includes a housing having a plant passageway for passage of the cotton plants therethrough and wherein means are provided within the housing for picking cotton from the plants, the improvement which comprises a cotton retrieving apparatus to retrieve cotton dropping from the plants subsequent to the action of the picking means, said retrieving apparatus including a pair of right-hand and left-hand retrieving units one at each side of the path of travel of the plants leaving the plant passageway, each of said units including a trough, an endless traveling belt having cotton-catching teeth to gather cotton in the trough, means at one place to crowd the cotton toward the belt, and means to remove the cotton from the belt at another place, said crowding means comprising a rotatable roller for cooperating with the toothed belt to form a restricted passage between the roller and the toothed belt, said passage extending the full height of the toothed portion of the belt.

2. In a cotton picking machine wherein a traveling picker unit includes a housing having a plant passageway for passage of the cotton plants therethrough and wherein means are provided within the housing for picking cotton from the plants, the improvement which comprises a cotton retrieving apparatus to retrieve cotton dropping from the plants subsequent to the action of the picking means, said retrieving apparatus including a pair of right-hand and left-hand retrieving units one at each side of the path of travel of the plants leaving the plant passageway, each of said units including a trough, an endless traveling belt having cotton-catching teeth to gather cotton in the trough, means at one place to crowd the cotton toward the belt, and means to remove the cotton from the belt at another place, said cotton removing means comprising a rotary brush mounted to engage the teeth of said toothed belt and brush off the cotton thereon and a suction nozzle and duct to which said brush delivers the cotton.

3. In a cotton picking machine wherein a traveling picker unit includes a housing having a plant passageway for passage of the cotton plants therethrough and wherein means are provided within the housing for picking cotton from the plants, the improvement which comprises a cotton retrieving apparatus to retrieve cotton dropping from the plants subsequent to the action of the picking means, said retrieving apparatus including a pair of right-hand and left-hand retrieving units one at each side of the path of travel of the plants leaving the plant passageway, each of said units including a trough, an endless traveling belt having cotton-catching teeth to gather cotton in the trough, means at one place to crowd the cotton toward the belt, and means to remove the cotton from the belt at another place, said crowding means comprising a rotatable roller for cooperating with the toothed belt to form a restricted passage between the roller and the toothed belt, said passage extending the full height of the toothed portion of the belt, said cotton removing means comprising a rotary brush mounted to engage the teeth of said toothed belt and brush off the cotton thereon and a suction nozzle and duct to which said brush delivers the cotton.

4. In a cotton picking machine wherein a traveling picker unit includes a housing having a plant passageway for passage of the cotton plants therethrough and wherein means are provided within the housing for picking cotton from the plants, the improvement which comprises a cotton retrieving apparatus to retrieve cotton dropping from the plants subsequent to the action of the picking means, said retrieving apparatus including a pair of right-hand and left-hand retrieving units one at each side of the path of travel of the plants leaving the plant passageway, each of said units including a trough, an endless traveling belt having cotton-catching teeth to gather cotton in the trough, means at one place to crowd the cotton toward the belt, and means to remove the cotton from the belt at another place, said crowding means comprising a rotatable roller for cooperating with the toothed belt to form a restricted passage between the roller and the toothed belt, said passage extending the full height of the toothed portion of the belt, each of said retriever units having a cover over said toothed belt and means to agitate said cover to slide off cotton, that may fall on the cover, into the trough.

5. A loose-cotton retriever for cotton picking machine units, which retriever comprises a right-hand and a left-hand retrieving unit, means by which said retrieving units may be mounted on a cotton picking machine to the rear of said picking units, each of said retriever units including: an elongated trough member, an endless traveling belt having cotton-catching teeth mounted in said trough, means adjacent said belt at the rear of the same at one side of the trough for causing cotton in the trough to be distributed over the adjacent portion of the toothed face of the belt to be caught by said teeth, and means at another place in the trough for removing the caught cotton from said teeth, said means to cause the cotton to be distributed over the adjacent portion of the toothed face of the belt including a rotating roller.

6. A loose-cotton retriever for cotton picking machine units, which retriever comprises a right-hand and a left-hand retrieving unit, means by which said retrieving units may be mounted on a cotton picking machine to the rear of said picking units, each of said retriever units including: an elongated trough member, an endless traveling belt having cotton-catching teeth mounted in said trough, means adjacent said belt at the rear of the same at one side of the trough for causing cotton in the trough to be distributed over the adjacent portion of the toothed face of the belt to be caught by said teeth, and means at another place in the trough for removing the caught cotton from said teeth, said cotton removing means comprising a rotary brush mounted to engage the teeth of said toothed belt and brush off the cotton thereon and a suction nozzle and duct to which said brush delivers the cotton.

7. A cotton retriever device for use with a cotton picking machine wherein said picking machine includes a traveling picking unit having a plant passageway for the passage of a row of cotton plants, said retriever device including a pair of elongated troughs for catching any cotton dropping from the plants subsequent to action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belts for engaging and hooking the cotton in said troughs, means carried on one side of each of said troughs adjacent the rear end thereof for directing the cotton into engagement with said teeth and means carried on the other side of each of said troughs for removing the cotton from said teeth.

8. A cotton retriever device for use with a cotton picking machine wherein said picking machine includes a traveling picking unit having a plant passageway for the passage of a row of cotton plants, said retriever device including a pair of elongated troughs for catching any cotton dropping from the plants subsequent to action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belts for engaging and hooking the cotton in said troughs, means carried on one side of each of said troughs adjacent the rear end thereof for directing the cotton into engagement with said teeth and means carried on the other side of each of said troughs for removing the cotton from said teeth, a cover mounted on each of said troughs and arranged to extend over the belt in each of said troughs and means mounted on one end of each of said troughs for agitating said covers to deliver any cotton falling on said covers into said troughs.

9. A cotton retriever device for use with a cotton picking machine wherein said picking machine includes a traveling picking unit having a plant passageway for the passage of a row of cotton plants, said retriever device including a pair of elongated troughs for catching any cotton dropping from the plants subsequent to action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belts for engaging and hooking the cotton in said troughs, means carried on one side of each of said troughs adjacent the rear end thereof for directing the cotton into engagement with said teeth and means carried on the other side of each of said troughs for removing the cotton from said teeth, each of said troughs having an opening formed at the rear end thereof, said traveling belts ejecting through said opening by centrifugal force any trash collected in said troughs.

10. A cotton retriever device for use with a cotton picking machine wherein said picking machine includes a traveling picking unit having a plant passageway for the passage of a row of cotton plants, said retriever device including a pair of trough members for catching any cotton dropping from the plants subsequent to the action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belt for engaging and hooking the cotton in said troughs, a cotton crowder carried on one side of each of said troughs adjacent the rear end thereof for directing the cotton into engagement with said teeth, each of said troughs having an opening formed at the rear end thereof for the ejecting of any trash collected in said troughs.

11. A cotton retriever device for use with a cotton picking machine wherein said picking machine includes a traveling picking unit having a plant passageway for the passage of a row of cotton plants, said retriever device including a pair of trough members for catching any cotton dropping from the plants subsequent to the action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belt for engaging and hooking the cotton in said troughs, a cover loosely mounted on and arranged to extend partially over each of said troughs, agitating means mounted on the forward end of each of said troughs for vibrating said covers to deliver any cotton falling thereon into said troughs, a cotton crowder carried on one side of each of said troughs adjacent the rear end thereof for directing the cotton into engagement with said teeth, each of said troughs having an opening formed at the rear end thereof for the ejection of any trash collected in said troughs.

12. A cotton retriever device for use with a cotton picking machine wherein said picking machine includes a traveling picking unit having a plant passageway for the passage of a row of cotton plants, said retriever device including a pair of trough members for catching any cotton dropping from the plants subsequent to the action of the picking unit, connecting means at the forward end of each of said trough adapted to detachably connect said troughs to said picking unit in spaced parallel relation with one another to define a restricted space therebetween in alignment with said plant passageway, an endless traveling belt positioned within each of said troughs, teeth on said belt for engaging and hooking the cotton in said troughs, a cover loosely mounted on and arranged to extend partially over each of said troughs, agitating means mounted on the forward end of each of said troughs for vibrating said covers to deliver any cotton falling thereon into said troughs, a cotton crowder carried on one side of each of said troughs adjacent the rear end thereof for directing the cotton into engagement with said teeth, a suction nozzle carried by the other side of each of said troughs for removing the cotton from said teeth, each of said troughs having an opening formed at the rear end thereof for the ejection of any trash collected in said troughs.

13. A cotton retriever device for use with a cotton picking machine wherein said picking machine includes a traveling picking unit having a plant passageway for the passage of a row of cotton plants, said retriever device including a pair of trough members for catching any cotton dropping from the plants subsequent to the action of the picking unit, connecting means at the forward end of each of said troughs adapted to detachably connect said troughs to said picking unit in spaced parallel relation with one another to define a restricted space therebetween in alignment with said plant passageway, an endless traveling belt positioned within each of said troughs, teeth on said belt for engaging and hooking the cotton in said troughs, a cover loosely mounted on and arranged to extend partially over each of said troughs, agitating means mounted on the forward end of each of said troughs for vibrating said covers to deliver any cotton falling thereon into said troughs, a cotton crowder carried on one side of each of said troughs adjacent the rear end thereof for directing the cotton into engagement with said teeth, a suction nozzle carried by the other side of each of said troughs for removing the cotton from said teeth, each of said troughs having an opening formed at the rear end thereof for the ejection of any trash collected in said troughs, a bail connected to the rear end of said troughs, a lever connected to said bail and a cable adapted to connect said lever to the picking unit.

JOHN D. RUST.

References Cited in the file of this patent

UNITED STATES PATENTS

| Number | Name | Date |
|---|---|---|
| 1,802,022 | Johnston et al. | Apr. 21, 1931 |
| 2,058,514 | Rust et al. | Oct. 27, 1936 |